United States Patent Office 3,205,204
Patented Sept. 7, 1965

3,205,204
PROCESS FOR POLYMERIZATION OF
VINYL CHLORIDE
Joseph Heckmaier and Hans Bauer, Burghausen, Upper
Bavaria, Germany, assignors to Wacker-Chemie
G.m.b.H., Munich, Germany, a firm of Germany
No Drawing. Filed Dec. 12, 1961, Ser. No. 158,860
Claims priority, application Germany, Dec. 16, 1960,
W 29,103
3 Claims. (Cl. 260—87.1)

This invention relates to a process of polymerization of vinyl chloride in aqueous dispersion in the presence of a water-soluble methyl cellulose produced by reaction of liquid methyl chloride with an alkali metal cellulose at a temperature between about 40° and 90° C.

Water-soluble methyl cellulose has already been recommended as a suspension stabilizer for the polymerization of unsaturated organic compounds in aqueous dispersion with the aid of monomer-soluble polymerization catalysts. However, it was disclosed on page 4 of German Patent No. 885,007 that the polymerizates obtained in the presence of methyl cellulose consist of coarse beads and the greater the diameter of the beads, the poorer were the properties of the polymerizates for further working. For instance, the soaking periods became too long in the treatment with plasticizers.

It is an object of the invention to develop a process for the polymerization of vinyl chloride and copolymerization of vinyl chloride and up to 10% of a vinyl ester of a lower alkanoic acid, said polymerization taking place in an aqueous dispersion in the presence of monomer-soluble polymerization catalysts and water-soluble methyl cellulose ethers produced by the reaction of liquid methyl chloride with alkali metal cellulose at temperatures between about 40° and 90° C.

Another object of the invention is to develop a process of polymerization of vinyl chloride in an aqueous dispersion in the presence of monomer-soluble polymerization catalysts and water-soluble methyl cellulose whereby fine polymer beads are obtained.

A further object of the invention is to improve the process of polymerization of vinyl chloride and copolymerization of vinyl chloride and up to 10% of a vinyl ester of a lower alkanoic acid, which polymerization occurs in an aqueous dispersion in the presence of monomer-soluble polymerization catalysts and methyl cellulose, by conducting the same in the presence of a water-soluble methyl cellulose produced by the reaction of liquid methyl chloride with an alkali metal cellulose at a temperature between about 40° and 90° C.

These and other objects of the invention will become more apparent as the description thereof proceeds.

It has no surprisingly been found that very fine and uniform polymerizates can be obtained by the polymerization of vinyl chloride or by the copolymerization of vinyl chloride with up to 10% of a vinyl ester of a lower alkanoic acid, in an aqueous dispersion with the aid of monomer-soluble polymerization catalysts, even if water-soluble methyl cellulose (degree of substitution 1 to 2.5 methoxy groups per glucose radical) is used as the suspension stabilizer, if the water-soluble methyl celluloses which are employed have been prepared by the reaction of liquid methyl chloride with an alkali metal cellulose at a temperature between about 40° and 90° C.

The preparation of the water-soluble methyl cellulose which is employed in accordance with the present invention as the suspension stabilizer in the polymerization of vinyl chloride is described in Belgium Patent No. 515,397. In accordance with this patent, liquid methyl chloride is reacted with an alkali metal cellulose at temperatures between 40° and 90° C. In pressure-resistant reaction vessels, the amount by weight of the liquid methyl chloride being at least five times the weight of air-dry alkali metal cellulose which is employed, and after the reaction the excess of methyl chloride is drained off. However, the water-soluble methyl cellulose which is employed according to the present invention may also be prepared according to British Patent No. 754,876 wherein, as an improvement of the process described in Belgium Patent No. 515,397, the alkali metal cellulose is soaked through with an amount of methyl chloride which corresponds to more than five times the amount of air-dry alkali metal cellulose employed, and wherein prior to the beginning of the methylation reaction, the excess methyl chloride is removed so that at most an amount corresponding to three times, and preferably from 3 to 1.5 times, the amount of alkali metal cellulose remains behind.

It is self-evident that analogously prepared mixed ethers of methyl cellulose, such as methyl hydroxyethyl cellulose, may also be employed in the process according to the present invention.

Prior to their employment in the process according to the present invention, the methyl cellulose compounds are preferably treated in accordance with the process described in U. S. Patent No. 2,833,758, that is they are homogenized at a water content of 50 to 70% by weight under pressure to give a plastic mass, which mass is milled in a high-speed rotating comminution mill and dried.

The viscosity of cellulose ethers which are to be employed in accordance with the invention lies preferably in the range of 6 to 500 centipoises (2% aqueous solution at 20° C. in the Höppler viscosimeter).

The methyl cellulose, which is used in accordance with the present invention, is employed in amounts of 0.01 to 0.25% by weight, preferably 0.04 to 0.15% by weight, based on the weight of vinyl chloride.

In the process according to the present invention, only fractional amounts of buffer salts which are normally required with the customary methyl cellulose compounds are sufficient in order to achieve the same effects.

Anionic, cationic, amphoteric and nonionic emulsifiers and/or inorganic salts may be used concurrently in amounts of 0.001 to 1% by weight, based on the weight of water. Examples of anionic emulsifiers are the following: Alkali metal salts, especially sodium, potassium and ammonium as well as alkaline earth metal, particularly calcium salts, of higher alkanoic acids, such as lauric acid, stearic acid, of higher unsaturated aliphatic hydrocarbon monocarboxylic acids, such as oleic acid, of rosin acids, such as abietic acid, of albumin fatty acid condensation products, of acid phosphoric acid alkyl esters, such as diethylhexyl sodium phosphate, of acid fatty alcohol sulfuric acid esters, of paraffin sulfonic acids, such as those which are on the market under the trademarks "Mersolate" and "Emulgator K–30," of alkyl naphthalene sulfonic acids and of sulfosuccinic acid dialkyl esters, such as sodium diethylhexyl sulfosuccinate.

Cationic emulsifiers may also be used, such as dodecyl trimethyl ammonium bromide, as well as amphoteric emulsifiers, such as dodecyl betain.

Examples of nonionic emulsifiers are partial fatty acid esters of polyvalent alcohols, such as glycerin monostearate, sorbitol monolaurate or sorbitol monopalmitate; partial ethers of higher fatty alcohols and polyvalent alcohols; polyoxyethylene ethers of fatty alcohols or aromatic hydroxy compounds, polyoxyethylene esters of fatty acids, as well as polypropylene oxide-polyethylene oxide condensation products which are sold under the trade name "Pluronics."

Examples of inorganic salts are the following: Water-soluble alkali metal, alkaline earth metal and aluminum salts of hydrochloric acid, sulfuric acid, carbonic acid and phosphoric acid, such as sodium chloride, sodium polyphosphate, sodium sulfate, calcium chloride, magnesium chloride, calcium bicarbonate and aluminum sulfate. For instance, the employment of a combination of sodium paraffin sulfonate and calcium chloride is very effective.

The pH value of the polymerization reaction mixture is adjusted in the range of 4 to 9, preferably between 5 to 8.

Up to 10% by weight of an unsaturated vinyl or acryl monomer which is copolymerizable with vinyl chloride, preferably a vinyl ester of a lower alkanoic acid, such as vinyl acetate, based on the total weight of the monomers, may be polymerized together with the vinyl chloride.

Examples of monomer-soluble polymerization catalysts are organic peroxides, such as acyl peroxides including diacetyl, dilauroyl, and bis-2,4-dichlorobenzoyl peroxide, or organic hydroperoxides, such as cumene hydroperoxide, or azo compounds which are known to be useful as polymerization catalysts, such as azo-isobutyric acid dinitrile. Preferred is the concurrent use of acyl peroxides, such as dilauroyl peroxide, with acetyl cyclohexane sulfonyl peroxide. By adding the acetyl cyclohexane sulfonyl peroxide it is not only possible to reduce the time of polymerization, but the polymer also becomes again more fine-grained.

The total amount of the polymerization catalysts amounts to 0.001 to 3% by weight, and the amount of acetyl cyclohexane sulfonyl peroxide is from 0.00005 to 0.3% by weight, based in each instance upon the weight of vinyl chloride monomer or monomers.

The polymerization by the process according to the present invention is advantageously effected with a monomer-water ratio of 1:1 to 1:3 at temperatures which lie in the range of 0° to 80° C. in enameled or $V_2A$ steel-plated autoclaves, accompanied by vigorous stirring. The higher the polymerization temperature employed, the greater is the tendency that a finer grain is formed, that means the proportion of finest grain having a size below $100\mu$ increases. However, the low temperature polymerization is carried out in order to prepare a polyvinyl chloride having a higher K value and therefore better mechanical properties. The lower the polymerization temperature (e.g. also 10° C.), the greater is, of course, the required amount of catalyst. A preferred rate of stirring lies, e.g., in the range of from 75 to 200 r.p.m.

The polymerization conditions, such as temperature, rate of stirring, amounts of monomer, water, catalyst, methyl cellulose, emulsifier and salt, and the viscosity of the methyl cellulose, are not critical. Obviously, however, these conditions must be in a certain relation to each other in order to meet the requirements regarding K value, grain size, powder density and capacity of taking up plasticizer.

In comparison to the amounts of methyl hydroxypropyl cellulose which are required in the process according to German Patent No. 885,007 for the polymerization of unsaturated organic compounds in aqueous suspension, the use of considerably smaller amounts of the methyl cellulose according to the present invention allows the production of an equally fine or even finer grain size. Foils obtained with the aid of plasticizers from the polymerizates produced according to the present invention do not have any pinholes or "fish eyes."

The following examples are illustrative of the invention. They are not, however, to be construed as limiting the invention. Obviously, other expedients known to those skilled in the art may be substituted for the specific embodiments hereinafter disclosed.

The viscosities indicated in the following examples were in each case measured at 20° C. in a Höppler viscosimeter on a 2% aqueous solution and are reported in centipoises (cp.).

EXAMPLE I

In a $V_2A$ steel-lined autoclave equipped with a stirrer, 3.65 kg. of methyl cellulose having a viscosity of 20 cp./20° C., prepared according to Belgium Patent No. 515,397 and subsequently treated according to U.S. Patent No. 2,833,758 (commercially obtainable under the trademark "Culminal 2007 K–18"), were dissolved in 6500 kg. of water. After displacing the air, 4200 kg. of vinyl chloride were polymerized in the presence of 2.5 kg. of dilauroyl peroxide and 0.6 kg. of sodium bicarbonate. The polymerization reaction was conducted at a temperature of 55° C. and a stirring speed of 120 r.p.m. for 18 hours. The polymerizate which had a K value of 70 was recovered by conventional method. 96% by weight of the dried polymerizate passed through a screen with a 0.1 mm. mesh opening. The polyvinyl chloride produced soft foils which were extraordinarily free from "fish eyes."

EXAMPLE II 150 liters of water containing 112.5 g. of methyl cellulose having a viscosity of about 500 cp., prepared according to Belgium Patent No. 515,397, and 11.3 g. of sodium bicarbonate were placed into a $V_2A$ steel-lined autoclave equipped with a stirrer. After displacing the air, 75 kg. of vinyl chloride containing 75 g. of dilauroyl peroxide as an initiator were added, and the mixture was polymerized at a stirring speed of 160 r.p.m. and a temperature of 54° C. over a period of 17 hours. The polymerizate obtained thereby had a packed density of 714 g./l. If, in contrast thereto, a methyl cellulose was used which was prepared in the indicated manner but which had a viscosity of less than 100 cp., a packed density for the polyvinyl chloride beads of less than 600 g./l. (after 60 impacts) was obtained under the identical polymerization conditions.

EXAMPLE III

In a $V_2A$ steel-plated autoclave equipped with a stirrer, 4 kg. of methyl cellulose having a viscosity of about 20 cp., prepared according to Belgium Patent No. 515,397, were dissolved in 7000 kg. of water. After displacing the air, 4000 kg. of vinyl chloride were polymerized in the presence of 4 kg. of dilauroyl peroxide and 0.6 kg. of sodium bicarbonate at a temperature of 470 C. At the end of a running time of 26 hours (stirring speed 120 r.p.m.) the reaction had gone to completion and, after recovery, a polymerizate having a K value of 75 was obtained of which 69% by weight had a grain size of less than $100\mu$.

When the same run was repeated, but 1 kg. of the dilauroyl peroxide was replaced by 175 g. of acetyl cyclohexane sulfonyl peroxide, the running time was reduced to 19 hours at the same degree of completion of the reaction, and now 93% by weight of the polymerizate passed through a screen with a 0.1 mm. mesh opening.

EXAMPLE IV

The following materials were placed into a $V_2A$ steel-plated autoclave equipped with a stirrer: 1140 kg. of softened water, 700 g. of methyl cellulose prepared according to Belgium Patent 515,397 and subsequently treated according to U.S. Patent No. 2,833,758 and having a viscosity of 20 cp./20° C. ("Culminal 2007 K–18"), 937 g. of a 30% by weight aqueous solution of sodium paraffin sulfonate (commercially available under the trademark "Emulgator K–30"), 545 g. of calcuim chloride containing water of crystallisation, 46.8 g. of calcium carbonate and 500 g. of dilauroyl peroxide. After displacing the air, 500 kg. of vinyl chloride were added and the mixture was polymerized at a stirring speed of 155 r.p.m. and a temperature of 54° C. At the end of the polymerization period of about 17 hours, a polymerizate was obtained of which 99.9% passed through a screen with a 0.1 mm. mesh opening.

EXAMPLE V

The process of Example III was repeated with the exception that 3.15 kg., i.e. only 0.079% by weight, based on the vinyl chlroide, of methyl cellulose of about 20 cp./20° C., prepared according to Belgium Patent No. 515,397, were employed. The polymerization was carried out as in Example I at a temperature of 55° C. and under vigorous stirring, whereby a polymerizate was obtained of which 55% by weight had a grain size of less than 100$\mu$.

When the above process was repeated except that 125 g. of acetyl cyclohexane sulfonyl peroxide were added a polyvinyl chloride was obtained of which 88% had a grain size of less than 100$\mu$. If under the same polymerization conditions the amount of methyl cellulose of 0.079% by weight was reduced to 0.067% by weight, the proportion of polymer having a grain size of less than 100$\mu$ was still 77%.

For the purpose of comparison the above results are illustrated in the following table:

*Table*

| Percent of methyl cellulose based on monomer | ACSP,[1] g. | Percent by weight of polymer having a grain size of less than 100$\mu$ |
|---|---|---|
| 0.079 | | 55 |
| 0.079 | 125 | 88 |
| 0.067 | 125 | 77 |

[1] ACSP=acetyl cyclohexane sulfonyl peroxide.

While we have disclosed specific embodiments of the invention, it will be readily apparent to one skilled in the art that the present invention is not limited to these specific embodiments and that various changes and modifications may be made without departing from the spirit of the invention and the scope of the appended calims.

We claim:

1. In the process of preparing a polymerizate of a vinyl monomer selected from the group consisting of vinyl chloride and mixtures of vinyl chloride with up to 10% of a vinyl ester of a lower alkanoic acid, in water in the presence of a free-radical, monomer-soluble polymerization catalyst, water-soluble, inorganic buffer salts, and a water-soluble colloidal suspension agent, by agitating the mixture at a temperature between about 0° C. and 80° C. for a time sufficient to effect polymerization, the improvement which comprises utilizing as said suspension agent about 0.01% to 0.25% based on the weight of the vinyl monomer, of a water-soluble methyl cellulose prepared by the reaction of liquid methyl chloride with an alkali metal cellulose at a temperature between about 40° C. and 90° C.

2. In the process of preparing a polymerizate of a vinyl monomer selected from the group consisting of vinyl chloride and mixtures of vinyl chloride with up to 10% of a vinyl ester of a lower alkanoic acid, in water in the presence of a free-radical, monomer-soluble polymerization catalyst, water-soluble, inorganic buffer salts, and a water-soluble colloidal suspension agent, by agitating the mixture at a temperature between about 0° C. and 80° C. for a time sufficient to effect polymerization, the improvement which comprises utilizing as said suspension agent about 0.01% to 0.25% based on the weight of the vinyl monomer, of a water-soluble methyl cellulose prepared by the reaction of liquid methyl chloride with an alkali metal cellulose at a temperature between about 40° C. and 90° C. which water-soluble methyl cellulose is subjected to a process of homogenization at a water content of 50% to 70% by weight under pressure to give a plastic mass which is milled in a high speed rotating comminution mill and dried before use.

3. In the process of preparing a polymerizate of a vinyl monomer selected from the group consisting of vinyl chloride and mixtures of vinyl chloride with up to 10% of a vinyl ester of a lower alkanoic acid, in water in the presence of a free-radical, monomer-soluble polymerization catalyst, water-soluble, inorganic buffer salts, and a water-soluble colloidal suspension agent, by agitating the mixture at a temperature between about 0° C. and 80° C. for a time sufficient to effect polymerization, the improvement which comprises utilizing as said suspension agent about 0.01% to 0.25% based on the weight of the vinyl monomer, of a water-soluble methyl cellulose prepared by the reaction of liquid methyl chloride with an alkali metal cellulose at a temperature between about 40° C. and 90° C. and utilizing from 0.001% to 3% by weight of said vinyl monomer of a mixture of free-radical, polymerization catalysts of which about 0.00005% to 0.3% by weight of vinyl monomer is acetyl cyclohexane sulfonyl peroxide.

References Cited by the Examiner

UNITED STATES PATENTS 2,875,185   2/59   Wiley _____ 260—87.7

FOREIGN PATENTS 754,876   8/56   Great Britain.

OTHER REFERENCES

Schildknecht: "Polymer Processes" (pages 72, 74, 106, 406 and 424 relied on), Interscience (1956).

JOSEPH L. SCHOFER, *Primary Examiner.*

LOUISE P. QUAST, JOSEPH R. LIBERMAN, LEON J. BERCOVITZ, WILLIAM H. SHORT, *Examiners.*